(12) United States Patent
Suematsu et al.

(10) Patent No.: US 12,497,483 B2
(45) Date of Patent: Dec. 16, 2025

(54) POLYCARBONATE RESIN, AND OPTICAL LENS AND OPTICAL FILM USING SAME

(71) Applicant: MITSUBISHI GAS CHEMICAL COMPANY, INC., Tokyo (JP)

(72) Inventors: Mitsutake Suematsu, Tokyo (JP); Shinya Ikeda, Niigata (JP); Noriyuki Kato, Tokyo (JP); Mitsuteru Kondo, Tokyo (JP); Katsushi Nishimori, Tokyo (JP); Yutaro Harada, Tokyo (JP); Shoko Murata Suzuki, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 554 days.

(21) Appl. No.: 17/923,133

(22) PCT Filed: Apr. 28, 2021

(86) PCT No.: PCT/JP2021/016962
§ 371 (c)(1),
(2) Date: Nov. 3, 2022

(87) PCT Pub. No.: WO2021/230085
PCT Pub. Date: Nov. 18, 2021

(65) Prior Publication Data
US 2023/0192951 A1    Jun. 22, 2023

(30) Foreign Application Priority Data
May 11, 2020    (JP) .................. 2020-083292

(51) Int. Cl.
*C08G 64/16* (2006.01)
*G02B 1/04* (2006.01)

(52) U.S. Cl.
CPC ............. *C08G 64/16* (2013.01); *G02B 1/041* (2013.01)

(58) Field of Classification Search
CPC .... C08G 64/16; C08G 61/04; C08G 18/7621; C08G 18/7671; C08G 18/771; C08G 18/3215; C08G 18/10; C08G 18/6674; C08G 8/02; G02B 1/041; C07C 49/84; C07C 49/83
See application file for complete search history.

(56) References Cited

U.S. PATENT DOCUMENTS

| | | | | |
|---|---|---|---|---|
| 2002/0103328 | A1* | 8/2002 | Funakoshi | C08K 5/49 |
| | | | | 264/331.12 |
| 2013/0331527 | A1* | 12/2013 | Yokogi | C08L 69/00 |
| | | | | 525/469 |
| 2018/0321423 | A1 | 11/2018 | Kato et al. | |
| 2019/0241703 | A1* | 8/2019 | Kato | C08G 64/06 |

FOREIGN PATENT DOCUMENTS

| | | |
|---|---|---|
| JP | 6-25398 A | 2/1994 |
| JP | 2000-302857 A | 10/2000 |
| JP | 2000-302858 A | 10/2000 |
| JP | 2010-132782 A | 6/2010 |
| JP | 2014-185325 A | 10/2014 |
| JP | 2015-166951 A | 9/2015 |
| JP | 2017/078076 A1 | 5/2017 |
| JP | 2017-179323 A | 10/2017 |
| JP | 2018-104691 A | 7/2018 |
| JP | 2018-177887 A | 11/2018 |
| WO | 2007/142149 A1 | 12/2007 |
| WO | 2018/016516 A1 | 1/2018 |
| WO | 2020/213470 A1 | 10/2020 |

OTHER PUBLICATIONS

International Search Report and Written Opinion of the International Searching Authority issued in International Patent Application No. PCT/JP2021/016962, dated Jul. 6, 2021, along with an English translation thereof.
International Preliminary Report on Patentability issued in International Patent Application No. PCT/JP2021/016962, dated Nov. 15, 2022, along with an English translation thereof.

* cited by examiner

*Primary Examiner* — Shane Fang
(74) *Attorney, Agent, or Firm* — GREENBLUM & BERNSTEIN P.L.C.

(57) ABSTRACT

Provided is a polycarbonate resin which maintains favorable properties as an optical material while having fluidity suitable for molding. Furthermore, provided are an optical lens and an optical film that use the polycarbonate resin. The polycarbonate resin is characterized by comprising a component unit (A) expressed by general formula (1) and a component unit (B) expressed by general formula (2).

[Chemical Formula 1]

[Chemical Formula 2]

10 Claims, No Drawings

POLYCARBONATE RESIN, AND OPTICAL LENS AND OPTICAL FILM USING SAME

TECHNICAL FIELD

The present invention relates to a polycarbonate resin, as well as an optical lens and an optical film using the same. In more detail, the present invention relates to a polycarbonate resin that contains a structural unit having a specific binaphthyl skeleton, has excellent optical characteristics, and also has improved resin fluidity, as well as an optical lens and an optical film using the same.

BACKGROUND ART

Optical lenses are not only used as spectacles, but also used in a variety of situations, for example, as optical systems of various cameras such as cameras, film-integrated cameras and video cameras. Examples of important physical properties as such lens materials include a refractive index (nD) and an Abbe's number (ν). For optical design of an optical unit, use of a material with a high refractive index can realize a lens element that has a surface with a smaller curvature, which has advantages of decreasing aberration caused on this surface, decreasing the number of lenses, reducing eccentric sensitivity of the lens, and allowing reduction of size and weight of the lens system by decreasing the lens thickness.

Moreover, for optical design of an optical unit, combinational use of multiple lenses having different Abbe's numbers from each other is known to correct chromatic aberration. For example, a lens made of an alicyclic polyolefin resin having an Abbe's number ν of 45-60 and a lens made of a polycarbonate (nD=1.586, ν=30) resin composed of bisphenol A having a low Abbe's number can be combined to correct chromatic aberration.

As lens materials, optical glass and optical transparent resins are widely used. Optical transparent resins have advantages in that they allow production of aspherical lenses by injection molding and in that they allow mass production. Injection molding is a technique in which plastic is softened by heating, forced with injection pressure to fill in a mold to be molded, and then the molded body is taken out after cooling the resin.

Although the fluidity of the resin can be further enhanced by increasing the temperature for softening the resin, there is restriction on the softening temperature because of tendency of decomposition and coloring of the resin. In addition, while the mold temperature is kept constant in most molding machines, the upper limit of the mold temperature is limited to about 150° C. since pressurized water is used as a heat medium in a general mold temperature regulating machine. Accordingly, if such machine is used to produce a product with high surface accuracy, the upper limit of the glass-transition temperature of the resin that can be used is as high as about 160° C.

While a polycarbonate resin made of bisphenol A is widely used for optical lens applications, further enhancement of the refractive index of optical lenses is required due to expansion of the applications of optical lenses. Moreover, application of a polycarbonate resin made of bisphenol A has been limited because of the weakness of large birefringence. Therefore, development of an optical lens resin that has both high refractive index and low birefringence has extensively been conducted.

In order to enhance physical properties of a bisphenol A-type polycarbonate resin, copolymerization with other type of polycarbonate resin has been conducted. In particular, Patent Document 1 discloses that copolymerization with a structural unit represented by Formula (a) enhances the refractive index.

[Chemical Formula 1]

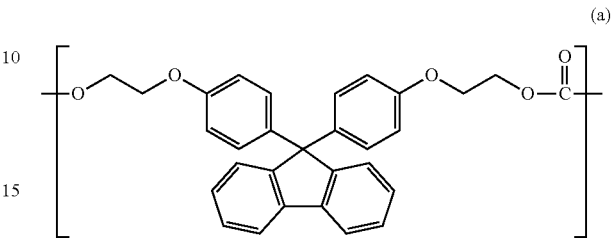

Moreover, Patent Document 2 discloses a copolymer of a polycarbonate resin containing a structural unit having a fluorene structure and bisphenol A.

Furthermore, as resins having a high refractive index, Patent Document 3 discloses copolymers in which bisphenol A-type polycarbonate or an aromatic polycarbonate resin is replaced with Formula (b). It is, however, described that although such resin composition has a higher refractive index, its glass-transition point exceeds 160° C.

[Chemical Formula 2]

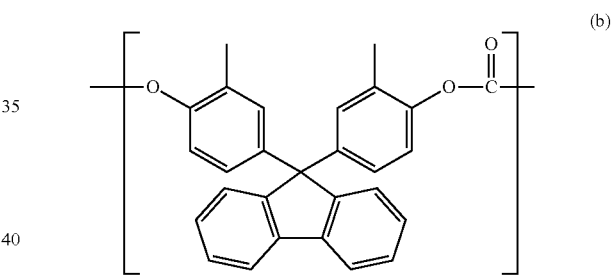

Also, polymers having a 1,1'-binaphthalene structure are described in Patent Documents 4-6. Specifically, Patent Documents 4-6 disclose polycarbonate resins having a 1,1'-binaphthalene structure, but there is still a need for polycarbonate resins having fluidity suitable for precision molding.

PRIOR ART DOCUMENTS

Patent Documents

[Patent Document 1] WO2007/142149

[Patent Document 2] Japanese Unexamined Patent Application Publication No. Heisei 6-25398

[Patent Document 3] Japanese Unexamined Patent Application Publication No. 2010-132782

[Patent Document 4] Japanese Unexamined Patent Application Publication No. 2000-302857

[Patent Document 5] Japanese Unexamined Patent Application Publication No. 2000-302858

[Patent Document 6] Japanese Translation of PCT International Application Publication No. 2015-166951

SUMMARY OF THE INVENTION

Problem to be Solved by the Invention

The present invention provides a polycarbonate resin that maintains favorable properties as an optical material while having fluidity suitable for molding. Furthermore, the present invention also provides an optical lens and an optical film that use the polycarbonate resin.

Means for Solving the Problems

In order to solve the above-described problem, the present inventors have gone through keen studies and found that this problem can be solved with a polycarbonate resin comprising a structural unit (A) represented by General Formula (1) and a structural unit (B) represented by General Formula (2), thereby accomplishing the present invention. Thus, the present invention is as follows.

<1> A polycarbonate resin comprising a structural unit (A) represented by General Formula (1) below and a structural unit (B) represented by General Formula (2) below.

[Chemical Formula 3]

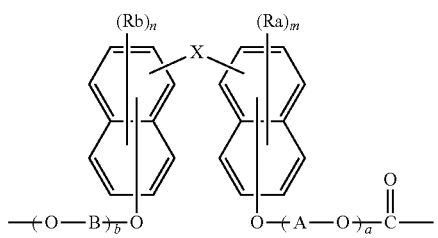

(1)

In Formula (1),

X represents a single bond or a fluorene group;

when X is a single bond, $R_a$ and $R_b$ are each independently selected from a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—$R_h$;

when X is a fluorene group, $R_a$ and $R_b$ are each independently selected from a hydrogen atom, a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—$R_h$;

$R_h$ represents an aryl group with a carbon number of 6-20 or a heteroaryl group with a carbon number of 6-20 containing 1 or more heterocycle atoms selected from O, N and S;

A and B each independently represent an alkylene group with a carbon number of 1-4;

m and n each independently represent an integer of 1-6; and a and b each independently represent an integer of 0-10.

[Chemical Formula 4]

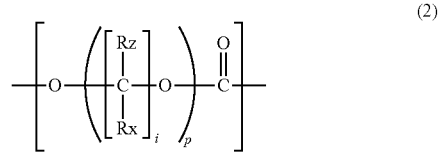

(2)

In Formula (2), $R_z$ and $R_x$ each independently represent a hydrogen atom or an alkyl group with a carbon number of 1-3; i represents an integer of 2-16; and p represents an integer of 1-600.

<2> The polycarbonate resin according to <1>, wherein the molar ratio (A/B) of the structural unit (A) and the structural unit (B) is 99.9/0.1-0.1/99.9.

<3> The polycarbonate resin according to <1> or <2>, wherein i in General Formula (2) above is an integer of 2-10 and p is 1-3.

<4> The polycarbonate resin according to any one of <1> to <3>, further comprising a structural unit (C) represented by General Formula (3) below.

[Chemical Formula 5]

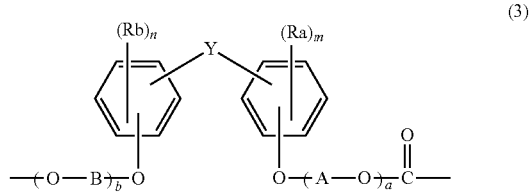

(3)

In Formula (3), $R_a$ and $R_b$ each independently represent a halogen atom, an alkyl group with a carbon number of 1-20, an alkoxyl group with a carbon number of 1-20, a cycloalkyl group with a carbon number of 5-20, a cycloalkoxyl group with a carbon number of 5-20, or an aryl group with a carbon number of 6-20;

Y represents —O—, —S—, —SO—, —SO2-, —CO—, a cycloalkylene group with a carbon number of 6-12, or a divalent group represented by General Formula (4) below or General Formula (5) below, where the cycloalkylene group is optionally substituted with 1-12 alkyl groups with a carbon number of 1-3;

A and B each independently represent an alkylene group with a carbon number of 1-4;

m and n each independently represent an integer of 0-4; and a and b each independently represent an integer of 1-10.

[Chemical Formula 6]

(4)

In Formula (4),

R$_c$ and R$_d$ are each independently selected from the group consisting of a hydrogen atom, a halogen atom, an alkyl group with a carbon number of 1-20, an alkoxy group with a carbon number of 1-5, an aryl group with a carbon number of 6-12, an aralkyl group with a carbon number of 7-17, and an alkenyl group with a carbon number of 2-15; and the alkyl group, the alkoxy group, the aryl group, the aralkyl group, and the alkenyl group in R$_c$ and R$_d$ each optionally have a substituent, R$_c$ and R$_d$ are optionally bonded to each other to form a carbocycle with a carbon number of 3-20 or a heterocycle with a carbon number of 1-20, where the carbocycle and the heterocycle each optionally have a substituent, and n represents an integer of 0-20.

[Chemical Formula 7]

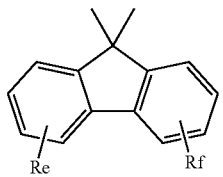

(5)

In Formula (5),

R$_e$ and R$_f$ are each independently selected from the group consisting of a hydrogen atom, a halogen atom, an alkyl group with a carbon number of 1-20, an alkoxy group with a carbon number of 1-7, an aryl group with a carbon number of 6-12, an aralkyl group with a carbon number of 7-17, and an alkenyl group with a carbon number of 2-15, where the alkyl group, the alkoxy group, the aryl group, the aralkyl group, and the alkenyl group each optionally have a substituent; and R$_e$ and R$_f$ are optionally bonded to each other to form a carbocycle with a carbon number of 3-20 or a heterocycle with a carbon number of 1-20, where the carbocycle and the heterocycle each optionally have a substituent.

<5> The polycarbonate resin according to <4>, wherein Y in General Formula (3) above is a fluorene group.

<6> The polycarbonate resin according to any one of <1> to <5>, wherein the weight average molecular weight (Mw) of the polycarbonate resin in terms of polystyrene is 1,000-100,000.

<7> The polycarbonate resin according to any one of <1> to <6>, wherein the glass-transition temperature (Tg) of the polycarbonate resin is 80-160° C.

<8> An optical lens comprising the polycarbonate resin according to any one of <1> to <7>.

<9> An optical film comprising the polycarbonate resin according to any one of <1> to <7>.

Effect of the Invention

According to the present invention, a polycarbonate resin that has a high refractive index and a low Abbe's number, maintains favorable properties as an optical material, and also has fluidity suitable for molding can be obtained. Furthermore, according to the present invention, an optical lens and an optical film can be precision-molded from this resin.

MODES FOR CARRYING OUT THE INVENTION (Polycarbonate Resin)

A polycarbonate resin of the present invention comprises a structural unit (A) represented by General Formula (1) below and a structural unit (B) represented by General Formula (2) below. In one embodiment of the present invention, the polycarbonate resin may comprise each of the structural units represented by General Formula (1) above and General Formula (2) above alone or two or more types of them in combination.

[Chemical Formula 8]

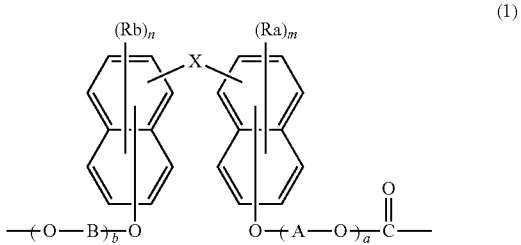

(1)

In Formula (1),

X represents a single bond or a fluorene group;

when X is a single bond, R$_a$ and R$_b$ are each independently selected from a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—R$_h$;

when X is a fluorene group, R$_a$ and R$_b$ are each independently selected from a hydrogen atom, a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—R$_h$;

R$_h$ represents an aryl group with a carbon number of 6-20 or a heteroaryl group with a carbon number of 6-20 containing 1 or more heterocycle atoms selected from O, N and S;

A and B each independently represent an alkylene group with a carbon number of 1-4;

m and n each independently represent an integer of 1-6; and a and b each independently represent an integer of 0-10.

[Chemical Formula 9]

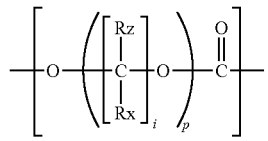

(2)

In Formula (2), $R_z$ and $R_x$ each independently represent a hydrogen atom or an alkyl group with a carbon number of 1-3; i represents an integer of 2-16; and p represents an integer of 1-600.

In a preferred embodiment of the present invention, in Formula (1), $R_a$ and $R_b$ are each independently selected from an aryl group with a carbon number of 6-20, a heteroaryl group with a carbon number of 6-20 containing 1 or more heterocycle atoms selected from O, N and S or an aryloxy group with a carbon number of 6-20, and —C≡C—$R_h$, where $R_h$ represents an aryl group with a carbon number of 6-20 or a heteroaryl group with a carbon number of 6-20 containing 1 or more heterocycle atoms selected from O, N and S.

The aryl group more preferably has a carbon number of 6-18, more preferably a carbon number of 6-16, more preferably a carbon number of 6-14, more preferably a carbon number of 6-12, and still more preferably a carbon number of 6-10.

The heteroaryl group more preferably has a carbon number of 6-18, more preferably a carbon number of 8-16, and still more preferably a carbon number of 10-14.

The aryloxy group more preferably has a carbon number of 6-18, more preferably a carbon number of 6-16, and still more preferably a carbon number of 6-14.

Also, in a preferred embodiment of the present invention, in Formula (1), when X is a single bond, $R_a$ and $R_b$ may be each independently selected from the group consisting of a phenyl group, a naphthyl group, and the following, and when X is a fluorene group, they may be each independently selected from the group consisting of a hydrogen atom, a phenyl group, a naphthyl group, and the following.

[Chemical Formula 10]

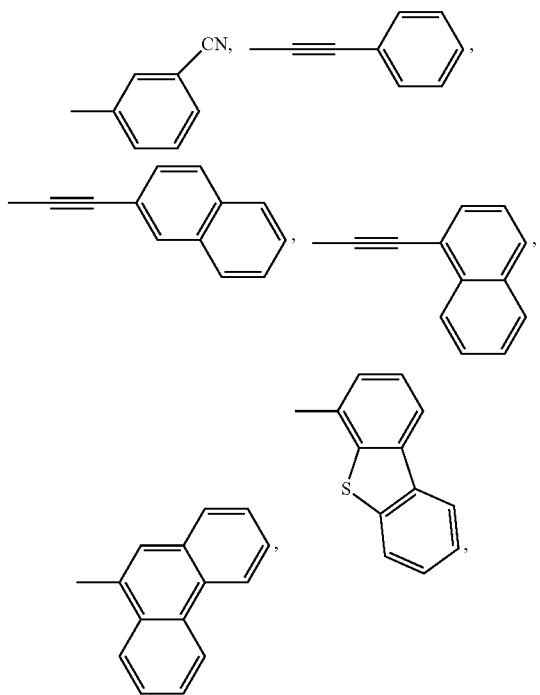

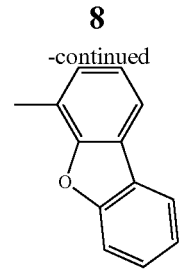

In a preferred embodiment of the present invention, in Formula (2), i is an integer of 2-14, 2-12, 2-10, 2-8, 2-6, 2-4, 4-16, 4-14, 4-12, 4-10, 4-8, 4-6, 6-16, 6-14, 6-12, 6-10, or 6-8, and p is an integer of 1-500, 1-400, 1-300, 1-200, 1-100, 1-50, 1-40, 1-30, 1-20, 1-15, 1-10, 1-8, 1-6, 1-4, 1-3, or 2-3.

Also, preferred examples of the aliphatic dihydroxy compound according to the structural unit (B) represented by Formula (2) include ethylene glycol, diethylene glycol, triethylene glycol, 1,3-propanediol, 1,2-propanediol, 1,4-butanediol, 1,3-butanediol, 1,2-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, and poly-n-propylene glycol. Preferred examples of the poly-n-propylene glycol include polyethylene glycol, polytrimethylene glycol, polytetramethylene glycol, polypentamethylene glycol, and polyhexamethylene glycol. Also, examples of commercially available products of the polytrimethylene glycol include the trade name "VELVETOL" manufactured by Allessa GmbH.

The polycarbonate resin of the present invention may also further comprise a structural unit (C) represented by General Formula (3) below.

[Chemical Formula 11]

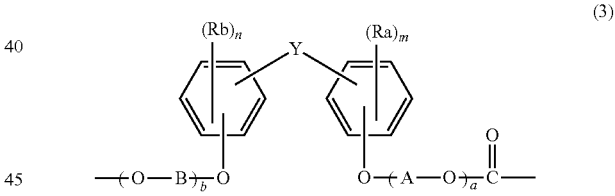

(3)

In Formula (3), $R_a$ and $R_b$ each independently represent a halogen atom, an alkyl group with a carbon number of 1-20, an alkoxyl group with a carbon number of 1-20, a cycloalkyl group with a carbon number of 5-20, a cycloalkoxyl group with a carbon number of 5-20, or an aryl group with a carbon number of 6-20;

Y represents —O—, —S—, —SO—, —SO2-, —CO—, a cycloalkylene group with a carbon number of 6-12, or a divalent group represented by General Formula (4) below or General Formula (5) below, where the cycloalkylene group is optionally substituted with 1-12 alkyl groups with a carbon number of 1-3;

A and B each independently represent an alkylene group with a carbon number of 1-4;

m and n each independently represent an integer of 0-4; and a and b each independently represent an integer of 1-10.

[Chemical Formula 12]

In Formula (4), $R_c$ and $R_d$ are each independently selected from the group consisting of a hydrogen atom, a halogen atom, an alkyl group with a carbon number of 1-20 (preferably, a carbon number of 1-5), an alkoxy group with a carbon number of 1-5 (preferably, a carbon number of 1-3), an aryl group with a carbon number of 6-12 (preferably, a carbon number of 6-8), an aralkyl group with a carbon number of 7-17 (preferably, a carbon number of 7-10), and an alkenyl group with a carbon number of 2-15 (preferably, a carbon number of 2-10), and preferably selected from the group consisting of a hydrogen atom, a methyl group, an ethyl group, an isopropyl group, an isobutyl group, and a phenyl group. More preferably, both $R_c$ and $R_d$ represent methyl groups.

The alkyl group, the alkoxy group, the aryl group, the aralkyl group, and the alkenyl group in $R_c$ and $R_d$ each optionally have a substituent.

$R_c$ and $R_d$ are optionally bonded to each other to form a carbocycle with a carbon number of 3-20 (preferably, a carbon number of 5-15) or a heterocycle with a carbon number of 1-20 (preferably, a carbon number of 5-10), where the carbocycle and the heterocycle each optionally have a substituent. Preferred examples of the substituent include a cyclohexyl group, an adamantyl group, a cyclododecane group, and a norbornane group.

In General Formula (4), n represents an integer of 0-20, preferably represents an integer of 0-5, and more preferably represents an integer of 0-2.

[Chemical Formula 13]

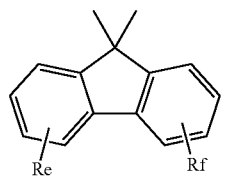

$R_e$ and $R_f$ in General Formula (5) are each independently selected from the group consisting of a hydrogen atom, a halogen atom, an alkyl group with a carbon number of 1-20 (preferably, a carbon number of 1-3), an alkoxy group with a carbon number of 1-7 (preferably, a carbon number of 1-3), an aryl group with a carbon number of 6-12 (preferably, a carbon number of 6-10), an aralkyl group with a carbon number of 7-17 (preferably, a carbon number of 7-11), and an alkenyl group with a carbon number of 2-15, and preferably selected from the group consisting of a hydrogen atom and a phenyl group. More preferably, both $R_e$ and $R_f$ represent hydrogen atoms.

The alkyl group, the alkoxy group, the aryl group, the aralkyl group, and the alkenyl group each optionally have a substituent, and preferred examples of the substituent include a phenyl group.

$R_e$ and $R_f$ are optionally bonded to each other to form a carbocycle with a carbon number of 3-20 (preferably, a carbon number of 3-10) or a heterocycle with a carbon number of 1-20 (preferably, a carbon number of 1-10), where the carbocycle and the heterocycle each optionally have a substituent.

In a preferred embodiment of the present invention, in Formula (3), Y represents a divalent group represented by General Formula (4) above or a divalent group represented by General Formula (5) above. Also, in Formula (3), Y is more preferably a fluorene group.

The polycarbonate resin of the present invention may also further comprise a structural unit (D) represented by General Formula (6) below.

[Chemical Formula 14]

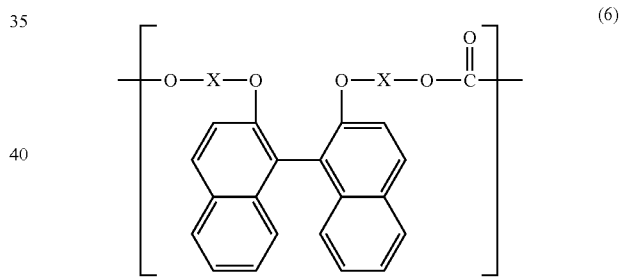

In Formula (6), X is an alkylene group with a carbon number of 1-4.

The polycarbonate resin of the present invention may comprise, for example, combinations of compounds shown in Table 1 below.

TABLE 1

| No. | Structural unit (A) | Structural unit (C) | Structural unit (D) |
|---|---|---|---|
| | Aromatic dihydroxy compound | | |
| 1 | Compound represented by Formula (1-1) | — | — |
| 2 | Compound represented by Formula (1-1) | Compound represented by Formula (3-1) | — |
| 3 | Compound represented by Formula (1-1) | — | Compound represented by Formula (6) |
| 4 | Compound represented by Formula (1-1) | Compound represented by Formula (3-1) | Compound represented by Formula (6) |
| 5 | Compound represented by Formula (1-2) | — | — |
| 6 | Compound represented by Formula (1-2) | Compound represented by Formula (3-1) | — |
| 7 | Compound represented by Formula (1-2) | — | Compound represented by Formula (6) |
| 8 | Compound represented by Formula (1-2) | Compound represented by Formula (3-1) | Compound represented by Formula (6) |
| 9 | Compound represented by Formula (1-1) and compound represented by Formula (1-2) | — | — |
| 10 | Compound represented by Formula (1-1) and compound represented by Formula (1-2) | Compound represented by Formula (3-1) | — |

TABLE 1-continued

| | Aromatic dihydroxy compound | | |
|---|---|---|---|
| No. | Structural unit (A) | Structural unit (C) | Structural unit (D) |
| 11 | Compound represented by Formula (1-1) and compound represented by Formula (1-2) | — | Compound represented by Formula (6) |
| 12 | Compound represented by Formula (1-1) and compound represented by Formula (1-2) | Compound represented by Formula (3-1) | Compound represented by Formula (6) |

Here, the combinations of compounds shown in Table 1 will be described. In Table 1, No. 1 to No. 4 show the cases in which the structural unit (A) comprises a compound in which X in Formula (1) is a single bond (hereinafter, referred to as Formula (1-1)). Also, No. 5 to No. 8 show the cases in which the structural unit (A) comprises a compound in which X in Formula (1) is a fluorene group (hereinafter, referred to as Formula (1-2)). No. 9 to No. 12 show the cases in which the structural unit (A) comprises a compound represented by Formula (1-1) and a compound represented by Formula (1-2).

Also, in Table 1, Nos. 2, 4, 6, 8, 10, and 12 show the cases in which the structural unit (C) comprises a compound in which Y in Formula (3) is a fluorene group (hereinafter, referred to as Formula (3-1)).

Hereinafter, each combination will be individually described.

(No. 1)

In one embodiment of the present invention, the polycarbonate resin may comprise a structural unit (A) represented by General Formula (1-1) below and the structural unit (B) represented by General Formula (2) above.

[Chemical Formula 15]

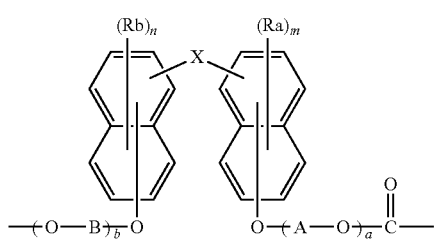

(1-1)

In Formula (1-1),

X represents a single bond;

$R_a$ and $R_b$ are each independently selected from a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—$R_h$;

$R_h$ represents an aryl group with a carbon number of 6-20 or a heteroaryl group with a carbon number of 6-20 containing 1 or more heterocycle atoms selected from O, N and S;

A and B each independently represent an alkylene group with a carbon number of 1-4;

m and n each independently represent an integer of 1-6; and a and b each independently represent an integer of 0-10.

General Formula (1-1) above may also be represented by General Formula (1-1A) below.

[Chemical Formula 16]

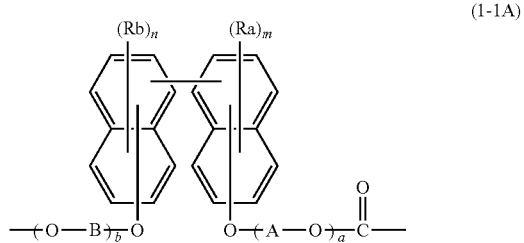

(1-1A)

In Formula (1-1A), $R_a$ and $R_b$ are each independently selected from a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—$R_h$;

$R_h$ represents an aryl group with a carbon number of 6-20 or a heteroaryl group with a carbon number of 6-20 containing 1 or more heterocycle atoms selected from O, N and S;

A and B each independently represent an alkylene group with a carbon number of 1-4;

m and n each independently represent an integer of 1-6; and a and b each independently represent an integer of 0-10.

(No. 2)

In one embodiment of the present invention, the polycarbonate resin may comprise the structural unit (A) represented by General Formula (1-1) above, the structural unit (B) represented by General Formula (2) above, and a structural unit (C) represented by General Formula (3-1) below.

[Chemical Formula 17]

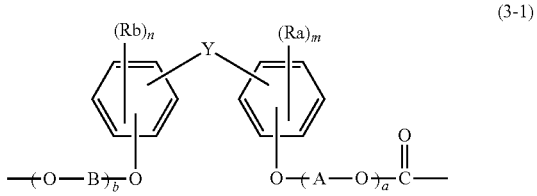

(3-1)

In Formula (3-1), $R_a$ and $R_b$ each independently represent a halogen atom, an alkyl group with a carbon number of 1-20, an alkoxyl group with a carbon number of 1-20, a cycloalkyl group with a carbon number of 5-20, a cycloalkoxyl group with a carbon number of 5-20, or an aryl group with a carbon number of 6-20;

Y represents a fluorene group;

A and B each independently represent an alkylene group with a carbon number of 1-4;

m and n each independently represent an integer of 0-4; and a and b each independently represent an integer of 1-10.

(No. 3)

In one embodiment of the present invention, the polycarbonate resin may comprise the structural unit (A) represented by General Formula (1-1) above, the structural unit (B) represented by General Formula (2) above, and the structural unit (D) represented by General Formula (6) above.

(No. 4)

In one embodiment of the present invention, the polycarbonate resin may comprise the structural unit (A) represented by General Formula (1-1) above, the structural unit (B) represented by General Formula (2) above, the structural unit (C) represented by General Formula (3-1) above, and the structural unit (D) represented by Formula (6) above.

(No. 5)

In one embodiment of the present invention, the polycarbonate resin may comprise a structural unit (A) represented by General Formula (1-2) below and the structural unit (B) represented by General Formula (2) above.

[Chemical Formula 18]

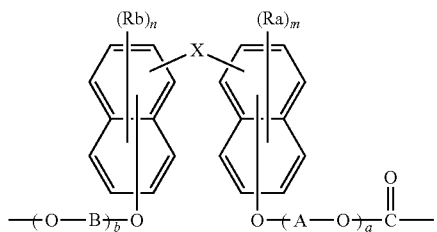

(1-2)

In Formula (1-2),

X represents a fluorene group;

$R_a$ and $R_b$ are each independently selected from a hydrogen atom, a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—$R_h$;

$R_h$ represents an aryl group with a carbon number of 6-20 or a heteroaryl group with a carbon number of 6-20 containing 1 or more heterocycle atoms selected from O, N and S;

A and B each independently represent an alkylene group with a carbon number of 1-4;

m and n each independently represent an integer of 1-6; and a and b each independently represent an integer of 0-10.

General Formula (1-2) above may also be represented by General Formula (1-2A) below.

[Chemical Formula 19]

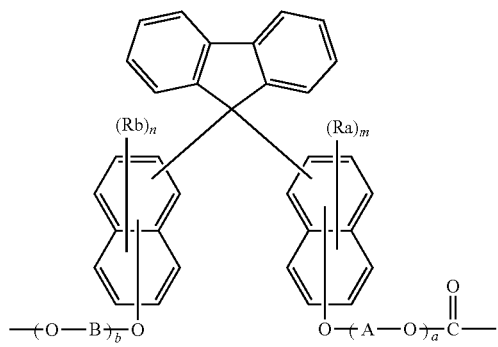

(1-2A)

In Formula (1-2A), $R_a$ and $R_b$ are each independently selected from a hydrogen atom, a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—$R_h$;

$R_h$ represents an aryl group with a carbon number of 6-20 or a heteroaryl group with a carbon number of 6-20 containing 1 or more heterocycle atoms selected from O, N and S;

A and B each independently represent an alkylene group with a carbon number of 1-4;

m and n each independently represent an integer of 1-6; and a and b each independently represent an integer of 0-10.

(No. 6)

In one embodiment of the present invention, the polycarbonate resin may comprise the structural unit (A) represented by General Formula (1-2) above, the structural unit (B) represented by General Formula (2) above, and the structural unit (C) represented by General Formula (3-1) above.

(No. 7)

In one embodiment of the present invention, the polycarbonate resin may comprise the structural unit (A) represented by General Formula (1-2) above, the structural unit (B) represented by General Formula (2) above, and the structural unit (D) represented by General Formula (6) above.

(No. 8)

In one embodiment of the present invention, the polycarbonate resin may comprise the structural unit (A) represented by General Formula (1-2) above, the structural unit (B) represented by General Formula (2) above, the structural unit (C) represented by General Formula (3-1) above, and the structural unit (D) represented by Formula (6) above.

(No. 9)

In one embodiment of the present invention, the polycarbonate resin may comprise the structural units (A) represented by General Formula (1-1) above and General Formula (1-2) above and the structural unit (B) represented by General Formula (2) above.
(No. 10)

In one embodiment of the present invention, the polycarbonate resin may comprise the structural units (A) represented by General Formula (1-1) above and General Formula (1-2) above, the structural unit (B) represented by General Formula (2) above, and the structural unit (C) represented by General Formula (3-1) above.
(No. 11)

In one embodiment of the present invention, the polycarbonate resin may comprise the structural units (A) represented by General Formula (1-1) above and General Formula (1-2) above, the structural unit (B) represented by General Formula (2) above, and the structural unit (D) represented by General Formula (6) above.
(No. 12)

In one embodiment of the present invention, the polycarbonate resin may comprise the structural units (A) represented by General Formula (1-1) above and General Formula (1-2) above, the structural unit (B) represented by General Formula (2) above, the structural unit (C) represented by General Formula (3-1) above, and the structural unit (D) represented by Formula (6) above.

The molar ratio (A/B) of the structural unit (A) and the structural unit (B) is preferably 99.9/0.1-0.1/99.9, more preferably 99/1-1/99, still more preferably 99/1-50/50, particularly preferably 99/1-60/40, and most preferably 90/10-70/30. By making the molar ratio of the structural unit (B) larger than the above range, the fluidity of the polycarbonate resin can be improved. In addition, by making the molar ratio of the structural unit (B) smaller than the above range, the optical characteristics of a molded body using the polycarbonate resin of the present invention can be maintained in a favorable range as an optical material.

The average molecular weight Mw of the polycarbonate resin in terms of polystyrene is preferably 1,000-100,000, more preferably 5,000-80,000, still more preferably 10,000-80,000, and particularly preferably 10,000-70,000. By making the Mw larger than the above range, the strength of the resin can be kept. In addition, by making the Mw smaller than the above range, the melt viscosity can be prevented from becoming excessively high, which makes it easier to take out the produced resin, and the fluidity will be good as well, which makes handling in the molten state easier.

(Method for Producing Polycarbonate Resin)

The method for producing the polycarbonate resin is not particularly limited. For example, it can be produced by subjecting a dihydroxy compound containing the structural unit (A) represented by Formula (1) above and an aliphatic dihydroxy compound containing the structural unit (B) represented by Formula (2) above to a melt polycondensation method in the presence of a diester carbonate and a catalyst. As the catalyst, a basic compound catalyst, a transesterification catalyst, or a mixed catalyst composed of both can be used.

The polycarbonate resin of the present invention may comprise a structural unit derived from a dihydroxy compound other than the dihydroxy compound containing the structural unit (A) represented by Formula (1) above. Examples of such other dihydroxy compound include:

alicyclic dihydroxy compounds such as 1,2-cyclohexane dimethanol, 1,3-cyclohexane dimethanol, 1,4-cyclohexane dimethanol, tricyclodecane dimethanol, pentacyclopentadecane dimethanol, 2,6-decalin dimethanol, 1,5-decalin dimethanol, 2,3-decalin dimethanol, 2,3-norbornane dimethanol, 2,5-norbornane dimethanol, 1,3-adamantane dimethanol, 1,4:3,6-dianhydrosorbitol, and 3,9-bis(1,1-dimethyl-2-dihydroxyethyl)-2,4,8,10-tetraoxaspiro-(5,5)-undecane; and aromatic dihydroxy compounds such as 2,2'-bis(2-hydroxyethoxy)-1,1'-binaphthalene, 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl) sulfone, 2,4'-dihydroxydiphenyl sulfone, bis(4-hydroxyphenyl) sulfide, 4,4'-dihydroxydiphenyl ether, 4,4'-dihydroxy-3,3'-dichlorodiphenyl ether, 9,9-bis(4-hydroxyphenyl) fluorene, and 9,9-bis(4-hydroxy-2-methylphenyl)fluorene.

Here, such other dihydroxy compound is preferably 20 mol % or less and more preferably 10 mol % or less with respect to 100 mol % of the dihydroxy compound containing the structural unit (A) represented by Formula (1) above. Within this range, a high refractive index can be retained.

Examples of the diester carbonate include diphenyl carbonate, ditolyl carbonate, bis(chlorophenyl) carbonate, m-cresyl carbonate, dimethyl carbonate, diethyl carbonate, dibutyl carbonate and dicyclohexyl carbonate. Among them, diphenyl carbonate is particularly preferable. Diphenyl carbonate is used preferably at a ratio of 0.90-1.15 moles, more preferably at a ratio of 0.95-1.10 moles, and still more preferably at a ratio of 1.00-1.10 moles with respect to 1 mole of the dihydroxy compound.

Examples of the basic compound catalyst particularly include alkali metal compounds and/or alkaline-earth metal compounds, and nitrogen-containing compounds.

Examples of the alkali metal compounds include organic acid salts, inorganic salts, oxides, hydroxides, hydrides and alkoxides of alkali metals. Specifically, sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenyl phosphate, a disodium salt, dipotassium salt, dicesium salt or dilithium salt of bisphenol A, a sodium salt, potassium salt, cesium salt or lithium salt of phenol, or the like can be used. Among them, sodium hydrogen carbonate is preferable.

Examples of the alkaline-earth metal compound include organic acid salts, inorganic salts, oxides, hydroxides, hydrides and alkoxides of alkaline-earth metal compounds. Specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate or the like can be used.

Examples of the nitrogen-containing compound include quaternary ammonium hydroxides and salts and amines thereof. Specifically, a quaternary ammonium hydroxide having an alkyl group, an aryl group or the like such as tetramethylammonium hydroxide, tetraethylammonium hydroxide, tetrapropylammonium hydroxide, tetrabutylammonium hydroxide or trimethylbenzylammonium hydroxide, a tertiary amine such as triethylamine, dimethylbenzylamine or triphenylamine, a secondary amine such as diethylamine or dibutylamine, a primary amine such as propylamine or butylamine, an imidazole such as 2-methylimidazole, 2-phenylimidazole or benzimidazole, or a base or a basic salt such as ammonia, tetramethylammonium borohydride, tetrabutylammonium borohydride, tetrabutylammonium tetraphenyl borate or tetraphenylammonium tetraphenyl borate can be used.

As a transesterification catalyst, a salt of zinc, tin, zirconium or lead can preferably be used, which may be used alone or in combination. Specifically, zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonate, zirconium oxyacetate, zirconium tetrabutoxide, lead acetate (II), lead acetate (IV) or the like can be used. Such a catalyst is used at a ratio of $1\times10^{-9}$-$1\times10^{-3}$ moles and preferably at a ratio of $1\times10^{-7}$-$1\times10^{-4}$ moles, with respect to a total of 1 mole of a dihydroxy compound.

According to a melt polycondensation method, the above-described raw materials and catalyst are used to conduct melt polycondensation while removing by-products by transesterification upon heating under ordinary or reduced pressure. In general, the reaction is carried out in a multi-stage process, i.e., two or more stages.

In the melt polycondensation with this composition system, the dihydroxy compound containing the structural unit (A) represented by Formula (1) above and the aliphatic dihydroxy compound containing the structural unit (B) represented by Formula (2) above, as well as the diester carbonate, may be melted in a reaction container, and then allowed to react while retaining, rather than distilling away, a monohydroxy compound produced as a by-product. In such a case, the reaction time during which the monohydroxy compound produced as a by-product is retained rather than being distilled away, is 20 to 240 minutes, preferably 40 to 180 minutes and particularly preferably 60 to 150 minutes. In this case, if the monohydroxy compound produced as a by-product is distilled away immediately after its generation, the content of the high-molecular weight polymer in the resulting polycarbonate resin will be low. The above-mentioned reaction time is merely an example, and preferable reaction time may vary depending on the reaction scale.

Such a reaction may be carried out in either continuous or batch mode. The reaction device used may be of a vertical type equipped with anchor-shaped stirring blades, Maxblend stirring blades, helical ribbon-shaped stirring blades or the like, a horizontal type equipped with paddle blades, lattice blades, spectacle-shaped blades or the like, or an extruder type equipped with a screw. These may suitably be used in combination considering the viscosity of the polymer.

The method for producing a polycarbonate resin is preferably carried out without deactivating the catalyst. If necessary, however, the catalyst may be removed or deactivated after the polymerization reaction in order to retain heat stability and hydrolysis stability. In a case where the catalyst is to be deactivated, a technique of deactivating the catalyst by adding a known acidic substance can favorably be conducted. Specifically, as the acidic substance, an ester such as butyl benzoate; an aromatic sulfonic acid such as p-toluenesulfonic acid; an aromatic sulfonate ester such as butyl p-toluenesulfonic acid or hexyl p-toluenesulfonic acid; a phosphoric acid such as phosphorous acid, phosphoric acid or phosphonic acid; a phosphite ester such as triphenyl phosphite, monophenyl phosphite, diphenyl phosphite, diethyl phosphite, di-n-propyl phosphite, di-n-butyl phosphite, di-n-hexyl phosphite, dioctyl phosphite or monooctyl phosphite; a phosphate ester such as triphenyl phosphate, diphenyl phosphate, monophenyl phosphate, dibutyl phosphate, dioctyl phosphate or monooctyl phosphate; a phosphonic acid such as diphenyl phosphonate, dioctyl phosphonate or dibutyl phosphonate; a phosphonate ester such as diethyl phenyl phosphonate; a phosphine such as triphenyl phosphine or bis(diphenylphosphino)ethane; a boric acid such as a boric acid or phenylboric acid; an aromatic sulfonic acid salt such as dodecylbenzene sulfonate tetrabutyl phosphonium salt; an organic halide such as stearic acid chloride, benzoyl chloride or p-toluenesulfonic acid chloride; an alkyl sulfate such as dimethyl sulfate; an organic halide such as benzyl chloride; or the like can favorably be used, among which butyl p-toluenesulfonic acid is more favorable. Such a deactivating agent can be used in an amount of 0.01-50 mol times and preferably 0.3-20 mol times the amount of the catalyst. If the deactivating agent is less than 0.01 mol times the catalyst amount, the deactivating effect would be inadequate which is unfavorable. On the other hand, if the deactivating agent is more than 50 mol times the catalyst amount, heat resistance of the resin is deteriorated and the molded body is likely to be colored, which are unfavorable.

Following deactivation of the catalyst, a step of devolatilizing and removing the low-boiling compound in the polymer under a pressure of 0.1-1 mmHg at a temperature of 200-350° C. may be provided. For this step, a horizontal type device equipped with stirring blades that have excellent surface renewal capacity such as paddle blades, lattice blades, spectacle-shaped blades or the like, or a thin-film evaporator can preferably be used.

The content of foreign matters in the polycarbonate resin is desirably as small as possible, for which filtration of the molten raw material, filtration of the catalyst solution or the like can favorably be performed. The mesh of the filter is preferably 5 μm or less and more preferably 1 μm or less. Moreover, filtration of the generated resin can favorably be performed with a polymer filter. The mesh of the polymer filter is preferably 100 μm or less and more preferably 30 μm or less. Needless to say, the step for collecting the resin pellets should be carried out in a low dust environment, which is preferably Class 6 or lower and more preferably Class 5 or lower.

In addition, an antioxidant, a processing stabilizer, a mold release agent, an ultraviolet absorber, a fluidity modifier, a crystal nucleating agent, a reinforcing agent, a dye, an antistatic agent, an antibacterial agent or the like may be added to the polycarbonate resin of the present invention, if necessary.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl) propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzyl phosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy]ethyl}-2,4,8,10-tetraoxaspiro(5,5)undecane. Among them, pentaerythritol-tetrakis[3-(3,5-di-tert-butyl-4-hydroxyphenyl) propionate] is preferable. The content of an antioxidant in the polycarbonate resin is preferably 0.001-0.3 parts by mass with respect to 100 parts by mass of the polycarbonate resin.

Examples of the processing stabilizer include phosphorus-based processing heat stabilizers and sulfur-based processing heat stabilizers. Examples of the phosphorus-based processing heat stabilizers include phosphite, phosphoric acid, phosphonous acid, phosphonic acid and esters thereof. Specific examples include triphenyl phosphite, tris(nonylphenyl)phosphite, tris(2,4-di-tert-butylphenyl)phosphite, tris(2,6-di-tert-butylphenyl)phosphite, tridecyl phosphite, trioctyl phosphite, trioctadecyl phosphite, didecyl monophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis (2,4-dicumylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benezenephosphonate, dipropyl benezenephosphonate, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite. The content of the phosphorus-based processing heat stabilizer in the polycarbonate resin is preferably 0.001-0.2 parts by mass to 100 parts by mass of the polycarbonate resin.

Examples of the sulfur-based processing heat stabilizer include pentaerythritol-tetrakis(3-laurylthio propionate), pentaerythritol-tetrakis(3-myristylthio propionate), pentaerythritol-tetrakis(3-stearylthio propionate), dilauryl-3,3'-thio dipropionate, dimyristyl-3,3'-thio dipropionate and distearyl-3,3'-thio dipropionate. The content of the sulfur-based processing heat stabilizer in the polycarbonate resin is preferably 0.001-0.2 parts by mass to 100 parts by mass of the polycarbonate resin.

Preferably, 90 mass % or more of the mold release agent is made from an ester of alcohol and fatty acid. Specific examples of the ester of alcohol and fatty acid include esters of monohydric alcohol and fatty acid, and partial esters or complete esters of polyhydric alcohol and fatty acid. The above-described ester of monohydric alcohol and fatty acid is preferably an ester of a monohydric alcohol with a carbon atom number of 1-20 and a saturated fatty acid with a carbon atom number of 10-30. The partial ester or the complete ester of polyhydric alcohol and fatty acid is preferably a partial ester or a complete ester of a polyhydric alcohol with a carbon atom number 1-25 and a saturated fatty acid with a carbon atom number of 10-30.

Specific examples of the ester of a monohydric alcohol and a saturated fatty acid include stearyl stearate, palmityl palmitate, butyl stearate, methyl laurate and isopropyl palmitate. Examples of the partial ester or the complete ester of a polyhydric alcohol and a saturated fatty acid include complete esters or partial esters of dipentaerythritol such as monoglyceride stearate, monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritol hexastearate. Among them, stearate monoglyceride and laurate monoglyceride are particularly preferable. The content of such mold release agent is preferably in a range of 0.005-2.0 parts by mass, more preferably in a range of 0.01-0.6 parts by mass and still more preferably 0.02-0.5 parts by mass, with respect to 100 parts by mass of polycarbonate resin.

As the ultraviolet absorber, at least one ultraviolet absorber selected from the group consisting of benzotriazole-based ultraviolet absorbers, benzophenone-based ultraviolet absorbers, triazine-based ultraviolet absorbers, cyclic imino ester-based ultraviolet absorbers and cyanoacrylate-based ultraviolet absorbers is preferable. Specifically, any of the following ultraviolet absorbers may be used alone or two or more types of them may be used in combination.

Examples of the benzotriazole-based ultraviolet absorbers include 2-(2-hydroxy-5-methylphenyl)benzotriazole, 2-(2-hydroxy-5-tert-octyl phenyl)benzotriazole, 2-(2-hydroxyl-3,5-dicumylphenyl)phenylbenzotriazole, 2-(2-hydroxy-3-tert-butyl-5-methyl phenyl)-5-chlorobenzotriazole, 2,2'-methylenebis[4-(1,1,3,3-tetramethylbutyl)-6-(2N-benzotriazole-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amyl phenyl)benzotriazole, 2-(2-hydroxy-5-tert-octyl phenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazine-4-one) and 2-[2-hydroxy-3-(3,4,5,6-tetrahydrophthalimidemethyl)-5-methylphenyl]benzotriazole.

Examples of the benzophenone-based ultraviolet absorbers include 2,4-dihydroxy benzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydridate benzophenone, 2,2'-dihydroxy-4-methoxy benzophenone, 2,2',4,4'-tetrahydroxybenzophenone, 2,2'-dihydroxy-4,4'-dimethoxy benzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone. Examples of the triazine-based ultraviolet absorbers include 2-(4,6-diphenyl-1,3,5-triazine-2-yl)-5-[(hexyl)oxy]-phenol, 2-(4,6-bis(2,4-dimethylphenyl)-1,3,5-triazine-2-yl)-5-[(octyl)oxy]-phenol and 2,4,6-tris(2-hydroxy-4-hexyloxy-3-methylphenyl)-1,3,5-triazine.

Examples of the cyclic imino ester-based ultraviolet absorbers include 2,2'-bis(3,1-benzoxazine-4-one), 2,2'-p-phenylenebis(3,1-benzoxazine-4-one), 2,2'-m-phenylenebis (3,1-benzoxazine-4-one), 2,2'-(4,4'-diphenylene)bis(3,1-benzoxazine-4-one), 2,2'-(2,6-naphthalene)bis(3,1-benzoxazine-4-one), 2,2'-(1,5-naphthalene)bis(3,1-benzoxazine-4-one), 2,2'-(2-methyl-p-phenylene)bis(3,1-benzoxazine-4-one), 2,2'-(2-nitro-p-phenylene)bis(3,1-benzoxazine-4-one) and 2,2'-(2-chloro-p-phenylene)bis(3,1-benzoxazine-4-one).

Examples of the cyanoacrylate-based ultraviolet absorbers include 1,3-bis-[(2'-cyano-3',3'-diphenylacryloyl)oxy]-2, 2-bis[(2-cyano-3,3-diphenylacryloyl)oxy]methyl)propane and 1,3-bis-[(2-cyano-3,3-diphenylacryloyl)oxy]benzene.

The content of the ultraviolet absorber is preferably 0.01-3.0 parts by mass, more preferably 0.02-1.0 parts by mass and still more preferably 0.05-0.8 parts by mass, with respect to 100 parts by mass of the polycarbonate resin. As long as the blending amount is within such range, sufficient weatherability can be imparted to the polycarbonate resin depending on usage.

(Method for Producing Molded Body)

A molded body can be produced by using the polycarbonate resin of the present invention. For example, it may be molded by an arbitrary method such as an injection molding method, a compression molding method, an extrusion molding method, or a solution-casting method. Since the polycarbonate resin of the present invention has excellent moldability (good fluidity) and heat resistance (high glass-transition temperature), it can advantageously be used particularly for an optical lens or optical film that requires injection molding.

(Physical Properties of Polycarbonate Resin)

The glass-transition point (Tg) of the polycarbonate resin of the present invention is preferably 80° C.-160° C., more preferably 100° C.-160° C., still more preferably 120-160° C., particularly preferably 125-160° C., and most preferably 130-160° C.

The refractive index of a molded body produced from the polycarbonate resin of the present invention is preferably 1.640-1.725, preferably 1.640-1.705, preferably 1.640-1.700, preferably 1.640-1.690, more preferably 1.645-1.687, and still more preferably 1.650-1.685.

The Abbe's number of the molded body produced from the polycarbonate resin of the present invention is preferably 24 or lower, still more preferably 23 or lower, and particularly preferably 22 or lower. Although the lower limit of the Abbe's number is not particularly limited, if the molded body is used as an optical lens, considering the specifications upon use, it is preferably 13 or higher, preferably 15 or higher, preferably 17 or higher, and more preferably 18 or higher.

The melt volume flow rate (MVR) of the polycarbonate resin of the present invention is preferably 10 cm$^3$/10 min or more, more preferably 15 cm$^3$/10 min or more, and still more preferably 25 cm$^3$/10 min or more. Although the upper limit of the MVR is not particularly limited, from the viewpoint of moldability, it is preferably 100 cm$^3$/10 min or less, more preferably 70 cm$^3$/10 min or less, and still more preferably 60 cm$^3$/10 min or less.

The flexural strength of the molded body produced from the polycarbonate resin of the present invention is preferably 50 MPa or more, more preferably 60 MPa or more, and still more preferably 65 MPa or more. Although the upper limit of the flexural strength is not particularly limited, if the molded body is used as an optical lens, considering the specifications upon use, it is preferably 200 MPa or less, and still more preferably 120 MPa or less.

The alkylene glycol polymerization ratio, which will be mentioned later, of the polycarbonate resin of the present invention is preferably 60% or more, more preferably 80% or more, and still more preferably 90% or more. A high alkylene glycol polymerization ratio is preferable because it prevents deviation in the composition ratio and stabilizes the physical properties of the resulting resin.

(Optical Lens)

Since an optical lens produced by using the polycarbonate resin of the present invention has a high refractive index and excellent heat resistance, it can be used in a field that conventionally employs an expensive high refractive index glass lens, for example, telescopes, binoculars, TV projectors or the like, which is extremely useful. If necessary, it is preferably used in a form of an aspherical lens. Since an aspherical lens is capable of correcting spherical aberration to substantially zero with one lens, there is no need of cancelling the spherical aberration with a combinational use of a plurality of spherical lenses, and thus reduction in weight and reduction in production cost can be realized. Accordingly, an aspherical lens is particularly useful as a camera lens among the optical lenses.

Furthermore, an optical lens is molded by an arbitrary method such as an injection molding method, a compression molding method or an injection compression molding method. According to the present invention, an aspherical lens with a high refractive index and a low birefringence that is technically difficult to process with a glass lens can be obtained in a simple manner.

In order to prevent a foreign matter from mixing into an optical lens, the molding environment should be a low dust environment, which is preferably Class 6 or lower and more preferably Class 5 or lower.

(Optical Film)

Since an optical film produced from the polycarbonate resin of the present invention has excellent transparency and heat resistance, it can favorably be used as a film for a liquid crystal substrate, an optical memory card or the like.

In order to prevent a foreign matter from mixing into an optical film, the molding environment should be a low dust environment, which is preferably Class 6 or lower and more preferably Class 5 or lower.

EXAMPLES

Hereinafter, the present invention will be described by way of examples, although the present invention should not be limited in any way to these examples. The measurement values in the examples were measured by the following methods or devices.

1) Glass-transition temperature (Tg): The glass-transition temperature (Tg) was measured with a differential thermal scanning calorimeter (DSC). The specific conditions are as follows:

Device: DSC7000X, Hitachi High-Technologies Corporation

Sample amount: 5 mg

Atmosphere: Under nitrogen gas atmosphere

Temperature increasing condition: 10° C./min

2) Refractive index (nD): For a 0.1 mm thick film made of the polycarbonate resin produced in the following Examples, the refractive index was measured by the method of JIS-K-7142 using an Abbe refractometer.

3) Abbe's number (vd): For a 0.1 mm thick film made of the polycarbonate resin produced in the following Examples, the refractive indices were measured at wavelengths of 486 nm, 589 nm and 656 nm at 23° C. using an Abbe refractometer, and the Abbe's number was further calculated using the expression below.

$$vd=(nD-1)/(nF-nC)$$

nD: Refractive index at a wavelength of 589 nm
nC: Refractive index at a wavelength of 656 nm
nF: Refractive index at a wavelength of 486 nm 4) Weight Average Molecular Weight (Mw)

The weight average molecular weight of the resin was measured by the gel permeation chromatography (GPC)

method, and was calculated in terms of standard polystyrene. The device, columns, and measurement conditions used are as follows.
- GPC device: HLC-8420GPC manufactured by Tosoh Corporation
- Columns: TSKgel SuperHM-M×3 columns manufactured by Tosoh Corporation
  - TSKgel guardcolumn SuperH-H×1 column manufactured by Tosoh Corporation
  - TSKgel SuperH-RC×1 column manufactured by Tosoh Corporation
- Detector: RI detector
- Standard polystyrene: Standard polystyrene kit PStQuick C manufactured by Tosoh Corporation
- Sample solution: 0.2 mass % tetrahydrofuran solution
- Eluent: Tetrahydrofuran
- Eluent flow rate: 0.6 mL/min
- Column temperature: 40° C.

5) Melt Volume Flow Rate: MVR ($Cm^3$/10 Min)

The MVR was measured in accordance with ISO 1133 under conditions of 260° C. and a load of 2.16 kg.

Measurement equipment: Melt indexer T-111 (manufactured by Toyo Seiki Seisaku-sho, Ltd.)

6) Flexural Strength

Using injection molding (hybrid injection molding machine FNX140 manufactured by Nissei Plastic Industrial Co., Ltd.), test specimens (4 mmt) were prepared in accordance with JIS K 7139. After annealing at 100° C. for 12 h, the test specimens prepared were evaluated for flexural strength at 25° C. in accordance with JIS K 7171.

Measurement equipment: Autograph AGS-X (manufactured by Shimadzu Corporation)

7) Alkylene Glycol Polymerization Ratio

The ratios of alkylene glycol present in the resin at the time of preparation and after polymerization were measured using NMR (manufactured by Bruker), and the alkylene glycol polymerization ratio was calculated using the following calculation expression. Alkylene glycol polymerization ratio (%)=Ratio of alkylene glycol present in the resin after polymerization/ratio of alkylene glycol at the time of preparation×100

The measurement conditions for NMR are as follows.
- Device: Bruker NMR AVANCE III HD 500 MHz
- Flip angle: 30 degrees
- Relaxation delay: 1 sec
- Cumulative number: 16
- Measurement temperature: Room temperature (298 K)
- Concentration: 5 wt %
- Solvent: Deuterated chloroform
- Internal standard substance: Tetramethylsilane (TMS) 0.03 wt %

Example 1

DPBHBNA, BNEF, and 1,6-hexanediol in the amounts shown in Table 2 were placed as raw materials into a 500-milliliter reactor equipped with an agitator and a distillation device, followed by addition of diphenyl carbonate (DPC); 21.8500 g (0.1020 moles), and sodium hydrogen carbonate; $5.00×10^{-5}$ g ($6.00×10^{-7}$ moles). The reaction system was then replaced with nitrogen, and heated to 205° C. over 30 minutes under 760 Torr of nitrogen atmosphere and agitated.

After completely dissolving the raw materials, the decompression degree was adjusted to 150 Torr by spending 15 minutes, and the resultant was maintained under the conditions of 205° C. and 150 Torr for 20 minutes for transesterification. Furthermore, the temperature was increased to 240° C. at a rate of 37.5° C./hr, and the resultant was maintained under the conditions of 240° C. and 150 Torr for 10 minutes.

Thereafter, the decompression degree was adjusted to 120 Torr by spending 10 minutes, and the resultant was maintained under the conditions of 240° C. and 120 Torr for 70 minutes. Thereafter, the decompression degree was adjusted to 100 Torr by spending 10 minutes, and the resultant was maintained under the conditions of 240° C. and 100 Torr for 10 minutes. Moreover, the decompression degree was adjusted to 1 Torr or less by spending for another 40 minutes, to carry out polymerization reaction under the conditions of 240° C. and 1 Torr for 10 minutes while agitating. At the end of the reaction, nitrogen was blown into the reactor for applying pressure, and the generated polycarbonate resin was taken out. The physical properties of the obtained resin are shown in Table 3.

Examples 2-6 and Comparative Examples 1-3

Each polycarbonate resin was obtained by the same method as in Example 1, except that the raw materials were replaced with those shown in Examples 2-6 and Comparative Examples 1-3 in Table 2, respectively. The physical properties of the obtained resins are shown in Table 3.

Examples 7-13 and Comparative Examples 4-6

Each polycarbonate resin was obtained by the same method as in Example 1, except that the raw materials were replaced with those shown in Examples 7-13 and Comparative Examples 4-6 in Table 2, respectively. The physical properties of the obtained resins are shown in Table 3.

TABLE 2

| | Aromatic dihydroxy compound | | | | | | | | | | | |
|---|---|---|---|---|---|---|---|---|---|---|---|---|
| | Structural unit (A) | | | | | | | | | Structural unit (C) | | |
| | Raw material of structural unit (A) | Molecular weight | mol % | g | mol | Raw material of structural unit (A) | Molecular weight | mol % | g | mol | Raw material of structural unit (C) | Molecular weight | mol % |
| Example 1 | DPBHBNA | 526.63 | 50 | 26.3315 | 0.05 | BNEF | 538.64 | 34 | 18.3138 | 0.03 | — | — | — |
| Example 2 | DPBHBNA | 526.63 | 50 | 26.3315 | 0.05 | BNEF | 538.64 | 33 | 17.7751 | 0.03 | — | — | — |

TABLE 2-continued

| | | | | | | | | | | | | | |
|---|---|---|---|---|---|---|---|---|---|---|---|---|---|
| Example 3 | DPBHBNA | 526.63 | 30 | 15.7989 | 0.03 | BNEF | 538.64 | 28 | 15.0819 | 0.03 | BPPEF | 590.72 | 30 |
| Example 4 | DPBHBNA | 526.63 | 13 | 6.8462 | 0.01 | BNEF | 538.64 | 35 | 18.8524 | 0.04 | BPPEF | 590.72 | 40 |
| Comparative Example 1 | DPBHBNA | 526.63 | 34 | 17.9054 | 0.03 | BNEF | 538.64 | 32 | 17.2365 | 0.03 | BPPEF | 590.72 | 34 |
| Example 5 | — | — | — | — | — | BNEF | 538.64 | 27 | 14.5433 | 0.03 | BPPEF | 590.72 | 21 |
| Comparative Example 2 | — | — | — | — | — | BNEF | 538.64 | 27 | 14.5433 | 0.03 | BPPEF | 590.72 | 21 |
| Example 6 | DPBHBNA | 526.63 | 15 | 7.8995 | 0.02 | BNEF | 538.64 | 40 | 21.5456 | 0.04 | — | — | — |
| Comparative Example 3 | DPBHBNA | 526.63 | 15 | 7.8995 | 0.02 | BNEF | 538.64 | 40 | 21.5456 | 0.04 | — | — | — |
| Example 7 | 2DNBINOL-2EO | 626.75 | 47 | 20.1073 | 0.03 | — | — | — | — | — | BPPEF | 590.71 | 39 |
| Example 8 | 2DNBINOL-2EO | 626.75 | 47 | 19.4539 | 0.03 | — | — | — | — | — | BPPEF | 590.71 | 39 |
| Example 9 | 2DNBINOL-2EO | 626.75 | 47 | 19.6797 | 0.03 | — | — | — | — | — | BPPEF | 590.71 | 39 |
| Example 10 | 2DNBINOL-2EO | 626.75 | 47 | 19.8191 | 0.03 | — | — | — | — | — | BPPEF | 590.71 | 39 |
| Example 11 | 2DNBINOL-2EO | 626.75 | 47 | 19.6514 | 0.03 | — | — | — | — | — | BPPEF | 590.71 | 39 |
| Example 12 | 2DNBINOL-2EO | 626.75 | 47 | 19.6704 | 0.03 | — | — | — | — | — | BPPEF | 590.71 | 39 |
| Example 13 | 2DNBINOL-2EO | 627.75 | 80 | 33.5927 | 0.05 | — | — | — | — | — | — | — | — |
| Comparative Example 4 | 2DNBINOL-2EO | 626.75 | 30 | 12.7911 | 0.02 | — | — | — | — | — | BPEF | 438.51 | 70 |
| Comparative Example 5 | 2DNBINOL-2EO | 626.75 | 100 | 32.4183 | 0.05 | — | — | — | — | — | — | — | — |
| Comparative Example 6 | 2DNBINOL-2EO | 626.75 | 55 | 22.6148 | 0.04 | — | — | — | — | — | BPPEF | 590.71 | 45 |

| | Structural unit (C) | | Aromatic dihydroxy compound Structural unit (D) | | | | | Alkylene glycol Structural unit (B) | | | | |
|---|---|---|---|---|---|---|---|---|---|---|---|---|
| | g | mol | Raw material of structural unit (D) | Molecular weight | mol % | g | mol | Raw material of structural unit (B) | Molecular weight | mol % | g | mol |
| Example 1 | — | — | — | — | — | — | — | 1,6-Hexanediol | 118.18 | 16 | 1.8909 | 0.02 |
| Example 2 | — | — | — | — | — | — | — | Diethylene glycol | 106.12 | 17 | 1.8040 | 0.02 |
| Example 3 | 17.7216 | 0.03 | — | — | — | — | — | 1,6-Hexanediol | 118.18 | 12 | 1.4182 | 0.01 |
| Example 4 | 23.6288 | 0.04 | — | — | — | — | — | 1,6-Hexanediol | 118.18 | 12 | 1.4182 | 0.01 |
| Comparative Example 1 | 20.0845 | 0.03 | — | — | — | — | — | — | — | — | — | — |
| Example 5 | 12.4051 | 0.02 | BNE | 374.44 | 26 | 9.7354 | 0.03 | 1,6-Hexanediol | 118.18 | 26 | 3.0727 | 0.03 |
| Comparative Example 2 | 12.4051 | 0.02 | BNE | 374.44 | 52 | 19.4709 | 0.05 | — | — | — | — | — |
| Example 6 | — | — | BNE | 374.44 | 25 | 9.3610 | 0.03 | 1,6-Hexanediol | 118.18 | 20 | 2.3636 | 0.02 |
| Comparative | — | — | BNE | 374.44 | 45 | 16.8498 | 0.05 | — | 0 | — | — | — |

TABLE 2-continued
| Example | | | | | | | | | | | | |
|---|---|---|---|---|---|---|---|---|---|---|---|---|
| Example 3 | | | | | | | | | | | | |
| Example 7 | 16.1296 | 0.0273 | — | — | — | — | — | 1,5-Pentanediol | 104.15 | 14 | 1.0653 | 0.01 |
| Example 8 | 15.643 | 0.0265 | — | — | — | — | — | 1,6-Hexanediol | 118.18 | 14 | 1.1698 | 0.01 |
| Example 9 | 15.7602 | 0.0267 | — | — | — | — | — | 1,7-Heptanediol | 132.2 | 14 | 1.2763 | 0.01 |
| Example 10 | 15.9151 | 0.0269 | — | — | — | — | — | 1,8-Octanediol | 146.23 | 14 | 1.4447 | 0.01 |
| Example 11 | 15.841 | 0.0268 | — | — | — | — | — | 1,10-Decanediol | 174.28 | 14 | 1.7479 | 0.01 |
| Example 12 | 15.8105 | 0.0268 | — | — | — | — | — | 1,12-Dodecanediol | 202.34 | 14 | 2.0212 | 0.01 |
| Example 13 | — | — | — | — | — | — | — | 1,12-Dodecanediol | 202.34 | 20 | 2.7113 | 0.01 |
| Comparative Example 4 | 20.8286 | 0.0475 | — | — | — | — | — | — | — | — | — | — |
| Comparative Example 5 | — | — | — | — | — | — | — | — | — | — | — | — |
| Comparative Example 6 | 17.4393 | 0.0295 | — | — | — | — | — | — | — | — | — | — |
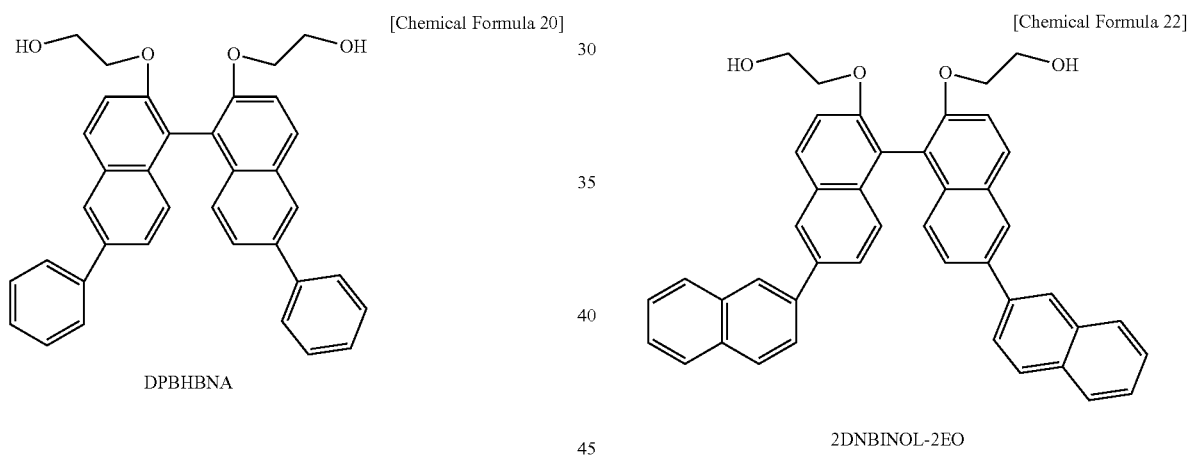
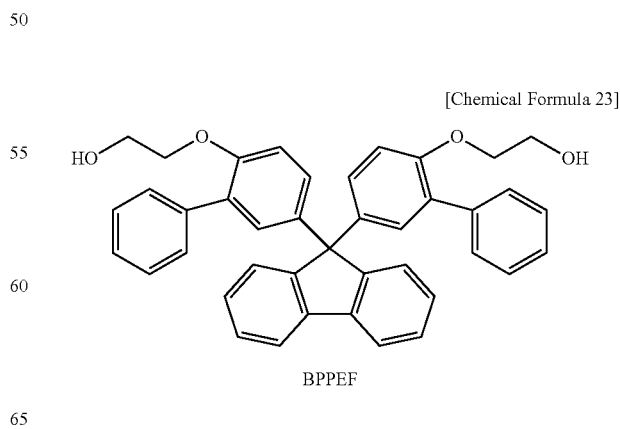

-continued

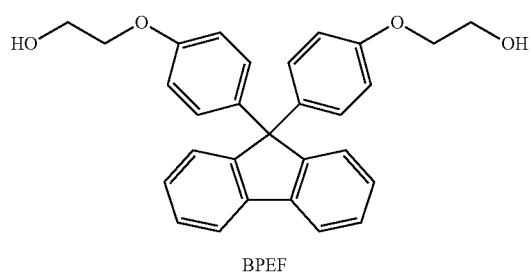

BPEF

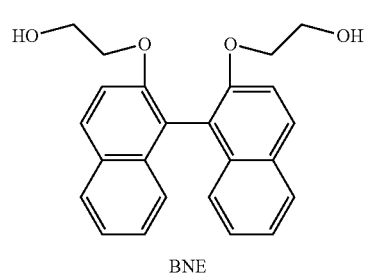

BNE

TABLE 3

| | Aromatic dihydroxy compound | | | | | |
|---|---|---|---|---|---|---|
| | Structural unit (A)/mol % | | Structural unit (C)/mol % | | Structural unit (D)/mol % | |
| Example 1 | DPBHBNA | 50 | BNEF | 34 | — | — |
| Example 2 | DPBHBNA | 50 | BNEF | 33 | — | — |
| Example 3 | DPBHBNA | 30 | BNEF | 28 | BPPEF | 30 |
| Example 4 | DPBHBNA | 13 | BNEF | 35 | BPPEF | 40 |
| Comparative Example 1 | DPBHBNA | 34 | BNEF | 32 | BPPEF | 34 |
| Example 5 | — | — | BNEF | 27 | BPPEF | 27 |
| Comparative Example 2 | — | — | BNEF | 27 | BPPEF | 21 |
| Example 6 | DPBHBNA | 15 | BNEF | 40 | — | — |
| Comparative Example 3 | DPBHBNA | 15 | BNEF | 40 | — | — |
| Example 7 | 2DNBINOL-2EO | 47 | — | — | BPPEF | 39 |
| Example 8 | 2DNBINOL-2EO | 47 | — | — | BPPEF | 39 |
| Example 9 | 2DNBINOL-2EO | 47 | — | — | BPPEF | 39 |
| Example 10 | 2DNBINOL-2EO | 47 | — | — | BPPEF | 39 |
| Example 11 | 2DNBINOL-2EO | 47 | — | — | BPPEF | 39 |
| Example 12 | 2DNBINOL-2EO | 47 | — | — | BPPEF | 39 |
| Example 13 | 2DNBINOL-2EO | 80 | — | — | BPPEF | 39 |
| Comparative Example 4 | 2DNBINOL-2EO | 30 | — | — | BPPEF | 70 |
| Comparative Example 5 | 2DNBINOL-2EO | 100 | — | — | — | — |
| Comparative Example 6 | 2DNBINOL-2EO | 55 | — | — | BPPEF | 45 |

| | | | | | Structural unit (D)/mol % |
|---|---|---|---|---|---|
| Example 1 | — | — | | | |
| Example 2 | — | — | | | |
| Example 3 | — | — | | | |
| Example 4 | — | — | | | |
| Comparative Example 1 | — | — | | | |
| Example 5 | BNE | 26 | | | |
| Comparative Example 2 | BNE | 52 | | | |
| Example 6 | BNE | 25 | | | |

| | | | Physical properties | | | Alkylene glycol polymerization ratio (%) |
|---|---|---|---|---|---|---|
| | Alkylene glycol Structural unit (B)/mol % | | nD | vd | Tg (°C.) | MVR (cm³/10 min) | Flexural strength (MPa) | |
| Example 1 | 1,6-Hexanediol | 16 | 1.685 | 17.2 | 155 | 30 | 81 | — |
| Example 2 | Diethylene glycol | 17 | 1.685 | 17.1 | 153 | 35 | 84 | — |
| Example 3 | 1,6-Hexanediol | 12 | 1.670 | 18.9 | 154 | 45 | 95 | — |
| Example 4 | 1,6-Hexanediol | 12 | 1.667 | 19.6 | 160 | 25 | 74 | — |
| Comparative Example 1 | — | — | 1.678 | 18.5 | 165 | 20 | 53 | — |
| Example 5 | 1,6-Hexanediol | 26 | 1.657 | 20.6 | 132 | 55 | 105 | — |
| Comparative Example 2 | — | — | 1.672 | 19.4 | 140 | 40 | 70 | — |
| Example 6 | 1,6-Hexanediol | 20 | 1.672 | 18.5 | 147 | 40 | 77 | — |
| Comparative Example 3 | — | — | 1.680 | 18.1 | 147 | 25 | 63 | — |
| Example 7 | 1,5-Pentanediol | 14 | 1.703 | 15.4 | 151 | 25 | — | 68 |
| Example 8 | 1,6-Hexanediol | 14 | 1.696 | 16.1 | 150 | 35 | — | 90 |
| Example 9 | 1,7-Heptanediol | 14 | 1.696 | 15.9 | 146 | 35 | — | 83 |
| Example 10 | 1,8-Octanediol | 14 | 1.694 | 15.9 | 145 | 50 | — | 93 |
| Example 11 | 1,10-Decanediol | 14 | 1.692 | 16.0 | 142 | 55 | — | 100 |
| Example 12 | 1,12-Dodecanediol | 14 | 1.691 | 16.1 | 142 | 65 | — | 96 |
| Example 13 | 1,12-Dodecanediol | 20 | 1.721 | 13.2 | 155 | 25 | — | — |
| Comparative Example 4 | — | — | 1.677 | 17.7 | 156 | 25 | — | — |
| Comparative Example 5 | — | — | 1.742 | 12.2 | 201 | Unmeasurable | — | — |

| | | | | | | | | |
|---|---|---|---|---|---|---|---|---|
| Comparative Example 6 | — | — | 1.703 | 15.1 | 180 | Unmeasurable | — | — |

As shown in Table 3, the refractive index and the Abbe's number of the polycarbonate resins of Examples 1-6, which contain both the structural unit (A) and the structural unit (B), were equivalent to those of the polycarbonate resins of Comparative Examples 1-3, which do not contain the structural unit (B). Also, the MVR and the flexural strength of the polycarbonate resins of Examples 1-6 were both higher than those of the polycarbonate resins of Comparative Examples 1-3. More specifically, the MVR and the flexural strength of the polycarbonate resin of Example 3 were both higher than those of the polycarbonate resin of Comparative Example 1, the MVR and the flexural strength of the polycarbonate resin of Example 5 were both higher than those of the polycarbonate resin of Comparative Example 2, and the MVR and the flexural strength of the polycarbonate resin of Example 6 were both higher than those of the polycarbonate resin of Comparative Example 3.

In addition, from the results of Examples 1, 2 and 4, it was confirmed that the MVR and the flexural strength exhibited were equivalent to those of other Examples even when the amounts of raw materials of the structural unit (A) and the type of raw material of the structural unit (B) were changed.

Furthermore, from the results of Examples 7-13, it was confirmed that the physical properties of the polycarbonate resins obtained were equivalent to those of Examples 1-6 even when the types of the structural unit (A) and the structural unit (B) were changed, and also that the alkylene glycol polymerization ratio was high.

As described above, it was found that the polycarbonate resin of the present invention has favorable properties as an optical material, while having fluidity suitable for molding and excellent flexural strength.

The invention claimed is:

1. A polycarbonate resin comprising a structural unit (A) represented by General Formula (1) below and a structural unit (B) represented by General Formula (2) below:

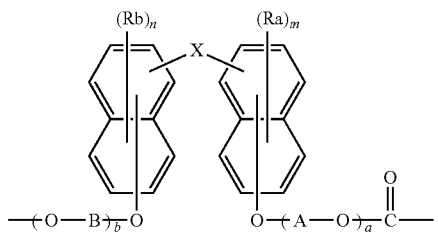

(1)

wherein
X represents a single bond;
$R_a$ and $R_b$ are each independently selected from a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—$R_h$;

$R_h$ represents an aryl group with a carbon number of 6-20 or a heteroaryl group with a carbon number of 6-20 containing 1 or more heterocycle atoms selected from O, N and S;
A and B each independently represent an alkylene group with a carbon number of 1-4;
m and n each independently represent an integer of 1-6; and
a and b each independently represent an integer of 0-10, and

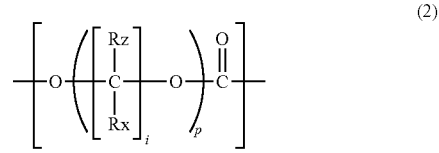

(2)

wherein $R_z$ and $R_x$ each independently represent a hydrogen atom or an alkyl group with a carbon number of 1-3; i represents an integer of 2-16; and p represents an integer of 1-600.

2. The polycarbonate resin according to claim 1, wherein the molar ratio (A/B) of the structural unit (A) and the structural unit (B) is 99.9/0.1-0.1/99.9.

3. The polycarbonate resin according to claim 1, wherein i in General Formula (2) above is an integer of 2-10 and p is 1-3.

4. The polycarbonate resin according to claim 1, further comprising a structural unit (C) represented by General Formula (3) below:

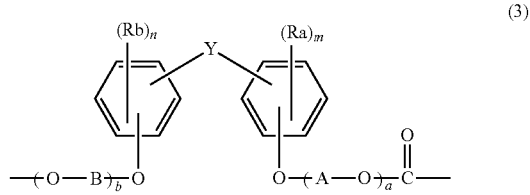

(3)

wherein
$R_a$ and $R_b$ each independently represent a halogen atom, an alkyl group with a carbon number of 1-20, an alkoxyl group with a carbon number of 1-20, a cycloalkyl group with a carbon number of 5-20, a cycloalkoxyl group with a carbon number of 5-20, or an aryl group with a carbon number of 6-20;
Y represents —O—, —S—, —SO—, —SO2-, —CO—, a cycloalkylene group with a carbon number of 6-12, or a divalent group represented by General Formula (4) below or General Formula (5) below, where the cycloalkylene group is optionally substituted with 1-12 alkyl groups with a carbon number of 1-3;
A and B each independently represent an alkylene group with a carbon number of 1-4;
m and n each independently represent an integer of 0-4; and
a and b each independently represent an integer of 1-10,

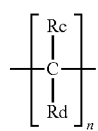

(4)

wherein $R_c$ and $R_d$ are each independently selected from the group consisting of a hydrogen atom, a halogen atom, an alkyl group with a carbon number of 1-20, an alkoxy group with a carbon number of 1-5, an aryl group with a carbon number of 6-12, an aralkyl group with a carbon number of 7-17, and an alkenyl group with a carbon number of 2-15; and the alkyl group, the alkoxy group, the aryl group, the aralkyl group, and the alkenyl group in $R_c$ and $R_d$ each optionally have a substituent, $R_c$ and $R_d$ are optionally bonded to each other to form a carbocycle with a carbon number of 3-20 or a heterocycle with a carbon number of 1-20, where the carbocycle and the heterocycle each optionally have a substituent, and n represents an integer of 0-20, and

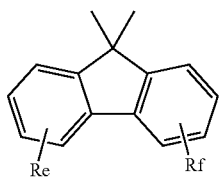

(5)

wherein $R_e$ and $R_f$ are each independently selected from the group consisting of a hydrogen atom, a halogen atom, an alkyl group with a carbon number of 1-20, an alkoxy group with a carbon number of 1-7, an aryl group with a carbon number of 6-12, an aralkyl group with a carbon number of 7-17, and an alkenyl group with a carbon number of 2-15, where the alkyl group, the alkoxy group, the aryl group, the aralkyl group, and the alkenyl group each optionally have a substituent; and $R_e$ and $R_f$ are optionally bonded to each other to form a carbocycle with a carbon number of 3-20 or a heterocycle with a carbon number of 1-20, where the carbocycle and the heterocycle each optionally have a substituent.

5. The polycarbonate resin according to claim 4, wherein Y in General Formula (3) above is a fluorene group.

6. The polycarbonate resin according to claim 1, wherein the weight average molecular weight (Mw) of the polycarbonate resin in terms of polystyrene is 1,000-100,000.

7. The polycarbonate resin according to claim 1, wherein the glass-transition temperature (Tg) of the polycarbonate resin is 80-160° C.

8. An optical lens comprising the polycarbonate resin according to claim 1.

9. An optical film comprising the polycarbonate resin according to claim 1.

10. The polycarbonate resin according to claim 1, wherein structural unit (A) further comprises a unit represented by General Formula (1') below:

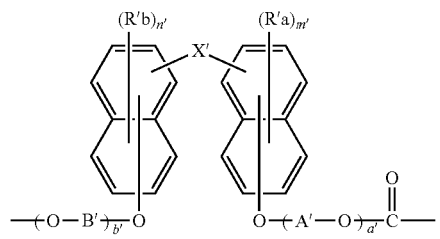

(1')

wherein

X is a fluorene group;

$R'_a$ and $R'_b$ are each independently selected from a hydrogen atom, a halogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20, a heteroaryl group with a carbon number of 6-20 containing 1 or more heterocycle atoms selected from O, N and S or an aryloxy group with a carbon number of 6-20, and —C≡C—$R'_h$;

$R'_h$ represents an aryl group with a carbon number of 6-20 or a heteroaryl group with a carbon number of 6-20 containing 1 or more heterocycle atoms selected from O, N and S;

A' and B' each independently represent an alkylene group with a carbon number of 1-4;

m' and n' each independently represent an integer of 1-6; and a' and b' each independently represent an integer of 0-10.

* * * * *